C. GABRIEL.
STRUCTURAL SHAPE SHEAR.
APPLICATION FILED MAR. 28, 1916.
1,309,848.
Patented July 15, 1919.
2 SHEETS—SHEET 2.
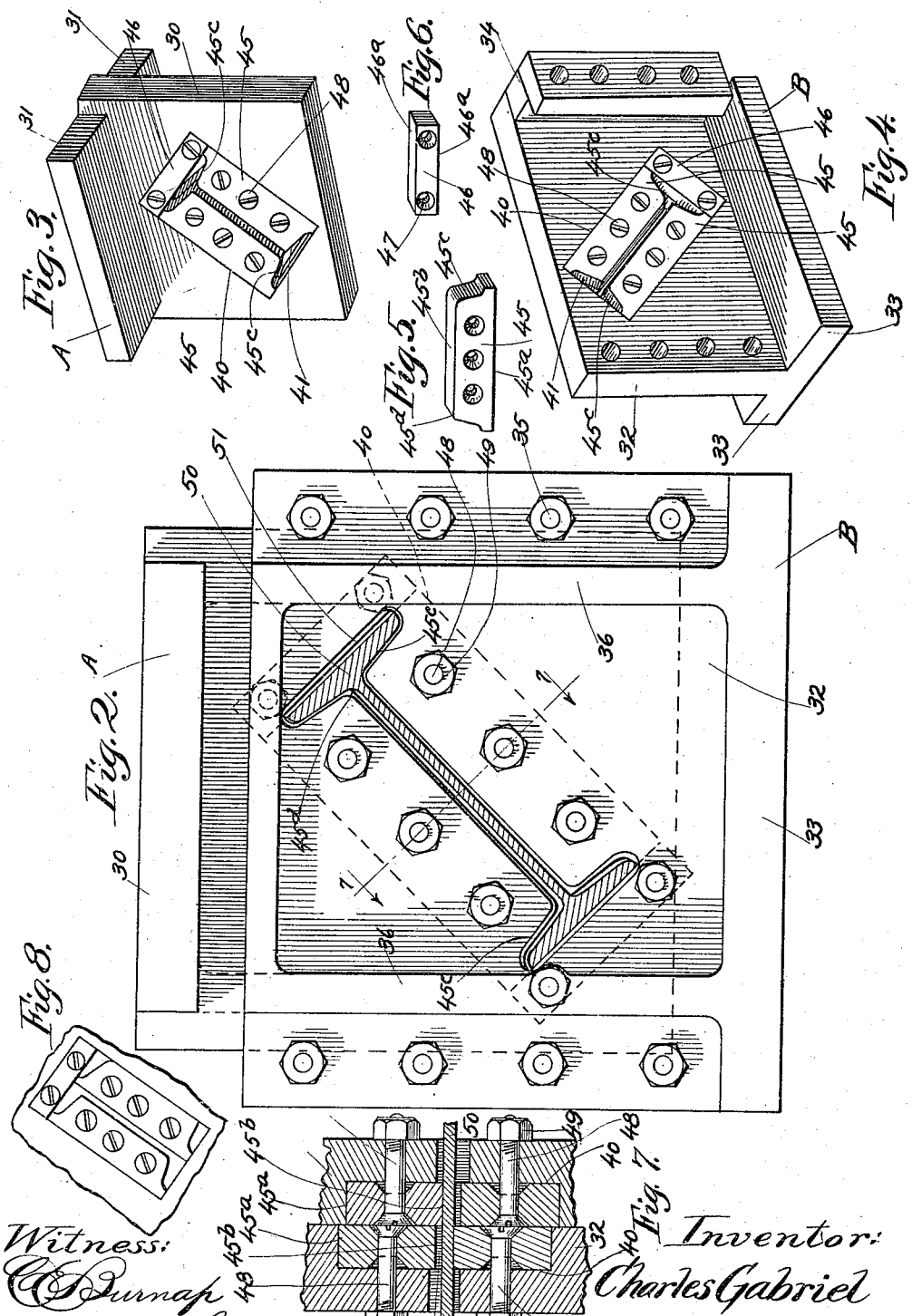
Witness:
C. F. Burnap
Inventor:
Charles Gabriel
By Sheridan, Wilkinson and Scott, Att'ys

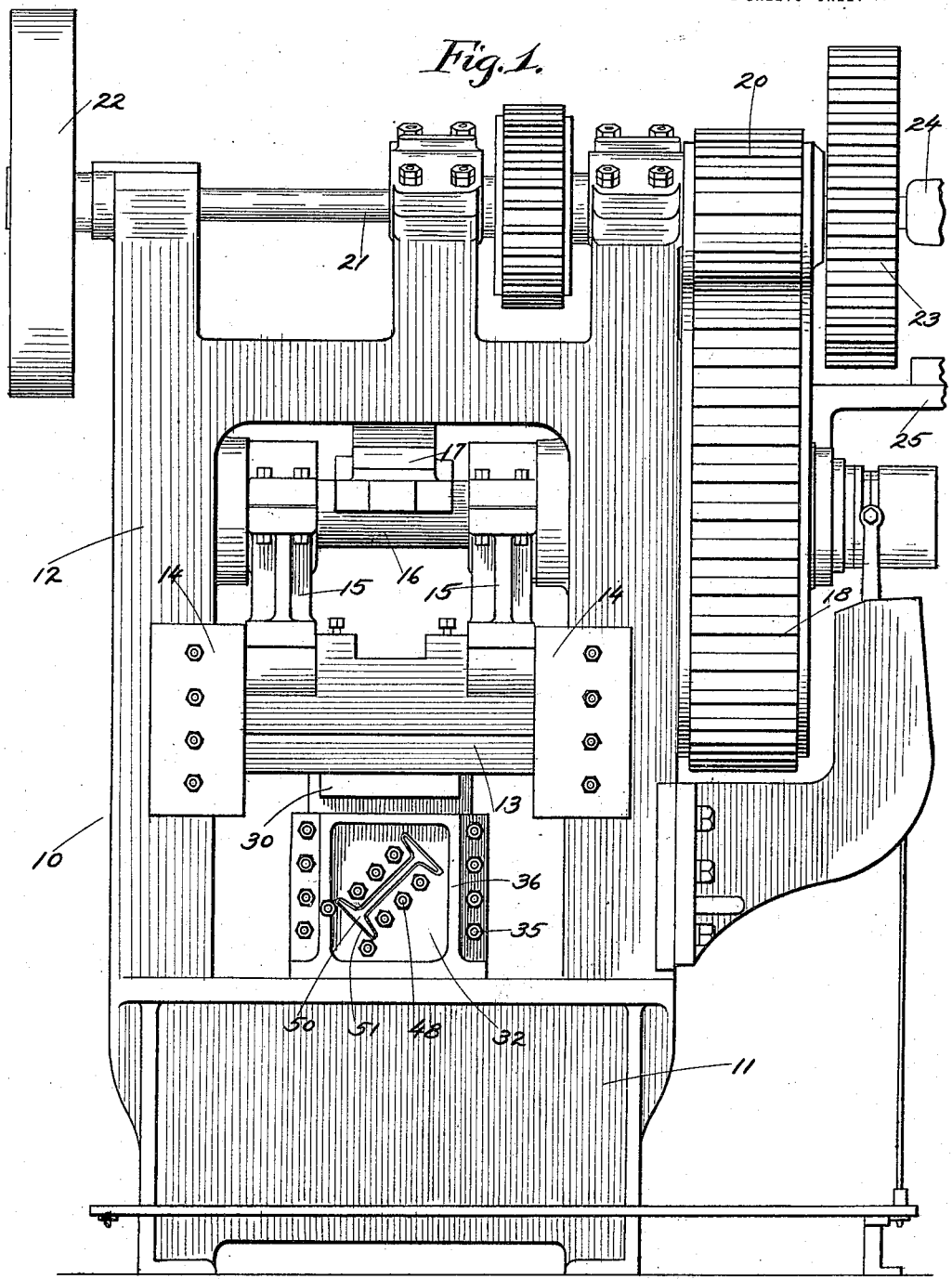

UNITED STATES PATENT OFFICE.

CHARLES GABRIEL, OF CHICAGO, ILLINOIS, ASSIGNOR TO A. M. CASTLE & CO., OF CHICAGO, ILLINOIS, A CORPORATION OF ILLINOIS.

STRUCTURAL-SHAPE SHEAR.

1,309,848.

Specification of Letters Patent.

Patented July 15, 1919.

Application filed March 28, 1916. Serial No. 87,180.

*To all whom it may concern:*

Be it known that I, CHARLES GABRIEL, a citizen of the United States, residing at Chicago, in the county of Cook and State of Illinois, have invented certain new and useful Improvements in Structural - Shape Shears, of which the following is a specification.

This invention relates to shearing apparatus adapted for use in shearing metal bars and the like, and in particular to improvements in the construction and arrangement of the cutting dies or blades embodied in such apparatus.

The apparatus of this invention is particularly adapted for use in shearing structural members having various shapes or configurations, and one object of the invention is to provide a shearing die which is adapted for use in shearing structural bars such as I-beams, angle bars, channel beams, and the like, or other members having various different contours or configurations. Another object is to provide a shearing die comprising parts which are reversible to effect the successive operation of different cutting edges without replacing the dies. A further feature relates to the provision of a shearing die comprising sectional cutting members which may be reversed or rearranged in order to effect the shearing of various different shapes of metallic members. Still another object is to provide a cutting die comprising a limited number of sections which are adapted to shear a plurality of shapes, which may be rearranged to shear still other shapes and which may be reversed to effect the operation of different cutting edges. Still another object is to provide a shearing apparatus in which the member to be sheared is held in a tilted position during the operation of shearing while the shearing members operate to exert a diagonal shearing stress on the member, the direction of which is inclined to the surfaces of said member. Still another object is to provide shearing apparatus comprising improved die holders and improved means for arranging and securing the shearing dies in the holders.

These and other objects of the invention will appear more clearly from the following specification taken in connection with the accompanying drawings, in which one embodiment of the invention is illustrated.

In the drawings:

Figure 1 shows a side elevation of a power shear or die press embodying the features of this invention;

Fig. 2 shows an enlarged side elevation of the die holders and dies with a structural element in position to be sheared;

Fig. 3 shows a perspective view of the upper or movable die holder with the cutting dies in position therein;

Fig. 4 shows a perspective view of the lower or fixed die-holder having its cutting dies in position therein;

Figs. 5 and 6 are perspective views showing the two forms of cutting dies used with the embodiment of the invention illustrated;

Fig. 7 shows a sectional view along the line 7—7 of Fig. 2; and

Fig. 8 shows an elevation of a portion of one of the die holders showing the sections of the die arranged for shearing a member or members having a different form or contour.

Referring to Fig. 1 of the drawings, the power shear or die press, designated generally by the numeral 10, comprises a base 11 carrying an upper frame structure 12 in which is mounted the vertically reciprocating ram 13 which slides in the guides 14 carried by the frame. The ram 13 is operated by the connecting rods 15 which are pivotally connected thereto and which are operatively connected with suitable eccentric disks mounted on the operating shaft 16 which is journaled in the frame 12, and which is supported on its upper side by the thrust bearing 17 located between the eccentrics. This shaft 16 is actuated through a gear 18 which in turn is driven by the pinion 20 mounted on the operating shaft 21. The power shaft 21 carries a fly-wheel 22 at one end and it is connected at the other end through suitable gears 23 with a driving motor 24 mounted on the supporting bracket or plate 25. The foregoing features do not constitute any part of the present invention and they are herein briefly described merely as a basis for showing and describing the construction and arrangement of the dies and die holders.

The upper die holder 30 comprises a body member or plate having two oppositely directed transverse flanges 31 which are secured to the ram 13 of the press so that when the ram is reciprocated the upper or movable die holder will have a corresponding movement. The lower die holder 32 comprises a body member or plate similar to that of the member 30 having at its lower end two oppositely directed flanges 33 which are rigidly secured to the base of the press. The movable die holder moves in a vertical plane adjacent to and contacting with the lower die holder 32, being guided in its movement by the guides 34 which are attached to the lateral edges of the lower or fixed die holder 32 by means of the bolts or other fastening means 35. The lower holder is provided on the side thereof opposite that engaged by the upper die holder with vertically extending reinforcing ribs 36 which unite the body portion of the holder with the adjacent transverse flange 33.

The die holders 30 and 32 are provided with similar recesses or depressions 40 preferably of rectangular outline and having angularly disposed walls which are adapted to form seats for the cutting or shearing dies. The recesses 40 are formed in the mutually contacting faces of the die holders and the vertical walls of these recesses are provided with similar apertures 41 which are adapted to aline with each other when the upper or movable die holder is in its normal or inoperative position. These apertures 41 are shaped to conform to the contour of some form of structural member or other metal bar which is to be sheared; in this instance, the apertures are shaped to conform to the cross sectional contour of I-beams, the apertures being formed so that when the beam to be sheared is passed through the alining apertures there will be a clearance between the surfaces of the beam and the adjacent surfaces or walls of the apertures. The seats 40 and apertures 41 also have their longitudinal axes inclined to the vertical for a purpose to be hereinafter described. The inclination is preferably about forty-five degrees.

The cutting or shearing dies which are employed in connection with the die holders above described are formed in sections, each section having irregular or other suitable cutting edges which is adapted to coöperate with the desired cutting edges of the adjacent sections to form a cutting die having an aperture or engageable part adapted to receive and conform generally to the contour of any desired member to be sheared. In this instance the sections which compose the upper and lower dies are similar in shape and contour, each cutting die being composed of two sectional dies 45 of similar shape and a third sectional die 46 which is in the form of a rectangular block having a square or other suitable rectangular cross section. Each of the sectional dies 45 comprises a plane surface $45^a$ having a cutting edge along each boundary thereof, an oppositely disposed plane surface $45^b$ having a cutting edge along each boundary thereof, and two irregular surfaces $45^c$ having cutting edges along the boundaries thereof. It will be seen that a portion of each of the members 45 conforms to the channel of an I-beam or a channel beam. Each of the sectional dies 46 comprises two oppositely disposed parallel plane surfaces $46^a$ having cutting edges along each lateral boundary thereof.

These sectional dies 45 and 46 are each provided with apertures 47 which are countersunk at both extremities thereof as shown for instance in Fig. 7, so that the heads of suitable bolts or screws 48 passing therethrough will lie flush with the surfaces of the dies. The bolts or screws 48 pass through suitable apertures in the vertical walls of the recesses or die seats 40 and are engaged by the nuts 49 whereby the sectional dies are held in position in the die seats. The bolting apertures 47 are similarly located in each of the dies 45 and in the walls of each of the die seats 40 so that the sectional dies 45 may be reversed or moved from one position in one die seat to another, or interchanged between the die seats of the upper and lower die holders. Each sectional die may also be reversed in position, the countersunk apertures 47 permitting the surfaces of the heads of the screws to lie flush with the surfaces of the dies in either position in which the dies are placed.

The sectional dies 45 and 46 are assembled in the upper and lower die holders, as shown in Figs. 2, 3, 4 and 7, for instance, so that the cutting edges of the sectional dies will, in a general way, conform to the contour of some portion of or the whole of the apertures 41 which are formed through the upper and lower die holders. In Figs. 2, 3, 4 and 7, the sectional dies 45 and 46 are assembled so that the aperture formed thereby is adapted to receive an I-beam, for instance, while in Fig. 8 the dies 45 are rearranged so that the aperture formed by the sectional dies conforms to a portion only of the corresponding aperture 41 in the die holder whereby the resulting die is adapted for use in shearing a channel beam, or an angle bar, for instance. Since the lowermost surfaces of the object to be sheared are supported and acted upon by the cutting edges or surfaces of the lower die holder, the sectional die 46 carried by the lower die holder is located at the lower end of the corresponding die seat 40 and the sectional dies 45 are placed above the same. The upper die acts upon the upper surfaces of the member to be sheared, however, and the member 46 of the upper die is therefore located at the upper end of the corresponding die seat 40 in the upper die holder so that it will coact with and exert a shearing force upon the upper surface of the object to be sheared. When the sectional dies have been assembled in the die holders, as described, and as illustrated in Figs. 2, 3 and 4, for instance, the apertures formed by the sectional dies of each die holder are adapted to aline with each other and with the apertures 41 formed through the die holders, so that a composite aperture is formed adapted to receive, for instance, an I-beam 50 which is to be sheared by the operation of the die press and the consequent downward movement of the upper die holder.

The apertures formed by the assembled sectional dies do not closely fit the I-beam 50, however, but a considerable clearance 51 is left around the uppermost surface of the I-beam, which clearance is less than the corresponding clearance between those surfaces of the beam and the lateral walls or edges of the apertures 41 through the die holders, that is, the cutting edges of the sectional dies project beyond the corresponding edges of the apertures through the die holders.

A very important feature of the invention is the location of the die seats 40 and apertures 41 in positions which are inclined to the vertical and horizontal planes, so that when the object to be sheared is in position in the die press, as illustrated, for instance, in Fig. 2, the various surfaces of the object to be sheared will occupy inclined positions, whereby as the upper die holder moves downward it will exert a diagonal shearing action on the member engaged by the dies, thus insuring a cleaner cut, and a more efficient operation of the dies than is possible when the die seats and the apertures 41 are located so that the surfaces of the object to be sheared occupy substantially horizontal and vertical planes. A further advantage of this feature of the construction is that the beams or other members to be sheared may be more readily placed in position in the press, where they fall by gravity to the desired positions on the die holders.

Upon referring to Fig. 2, for instance, it will be seen that when the beam 50 is placed in position it automatically falls to the lowest possible position, so that the clearance spaces 51 are adjacent the uppermost surfaces of the beam. When the upper die holder moves downwardly these clearance spaces are taken up until finally the dies carried by the upper die holder exert a shearing stress on the beam, resulting in the beam being sheared off along the plane of contact of the coacting dies. In order to insure a perfect shearing of the web of an I-beam, for instance, I preferably form the surfaces $45^b$ with sharp corners or edges $45^d$ at one end of the junctions of the surfaces $45^b$ with the adjacent surfaces $45^c$, and in the die holders the uppermost dies 45 carried by the die holders are located so that the sharp corners or edges $45^b$ are located adjacent the upper extremities of the die seats, in order that these sharp corners or cutting edges will engage the fillets at the junction of the web of the beam with the upwardly directed flanges thereof. The lower sectional dies 45 of the die holders are arranged with the sharp corners or edges $45^b$ adjacent the lower extremities of the die seats, so that they will engage the corresponding fillets at the junction of the web with the lower flange. In this way the cutting edges of the dies will engage and exert a shearing stress upon the metal of all parts of the beam at the beginning of the shearing operation, thus insuring a clean shear of the metal, which might not be so perfectly secured if the cutting surface at the junction of the surfaces $45^b$ and $45^c$ were left with a rounded contour, as it is at the other end of each of the sectional dies 45.

Inasmuch as the beam, when resting in the dieholders, occupies a position closer to the lower sectional dies than to the upper sectional dies, it may be desirable, on account of the taper of the flanges of the beam, to form or locate the surface $45^c$, at the uppermost end of the uppermost die carried by the lower die holder, closer to the adjacent surfaces of the dies 46 than the corresponding distances between those surfaces on the lower sectional dies 45 and the adjacent sectional dies 46. In this way the oppositely directed flanges of the beam will be equally supported at all times, thus preventing bending of portions of the beam which might occur if any part thereof were not supported on its underside at the beginning of the beam at the beginning of the shearholder.

Although the operation of the invention has been described in connection with the shearing of an I-beam, it will be understood that one of the most important advantages of this invention is that the dies are adapted for shearing various other forms of structural members, such as channel beams, I-beams, angle bars, and T-bars. With the arrangement of sectional dies shown in Figs. 2, 3, and 4, for instance, the apparatus may be employed for shearing T-beams, or I- beams, and with the arrangement of sectional dies shown in Fig. 8 the apparatus may be used for shearing channel beams or angle beams, in each instance without any rearrangement of the sectional dies. This reversibility of the dies and the possible rearrangement of the sections thereof to effect the shearing of various shapes, and the possibility of shearing a plurality of shapes with a particular setting of the dies, are very important advantages enabling the continued use of a single shearing apparatus for a variety of shearing operations. In the construction shown and described, but three different die sections are used, and two of these are of similar form, and yet it is possible to effect shearing operations upon a great variety of different shapes of metal members. A further important advantage lies in the fact that the sectional dies may be reversed in position so as to effect the operation of different cutting edges on the same dies, thus making possible the continued use of the same dies without the necessity of regrinding or replacing them.

It is possible not only to reverse and rearrange the sectional dies of one die holder within the die seat of that die holder, but the sectional dies may also be interchanged between the upper and lower die holders in order to effect the desired arrangement of the cutting surfaces, especially where one of the members is provided with a part such as the sharp cutting edge or corner 45$^d$, which is preferably provided on the cutting dies. For instance, the sectional dies 45, used with the lower die holder may be interchanged with those in the upper die holder and arranged in position for cutting I-beams, while retaining the sharp edges 45$^d$ in the desired positions in each of the die holders.

While a particular embodiment of the invention has been shown and described, and the operation thereof has been set forth in a particular manner for purposes of illustration, it will be understood that the invention may be embodied in widely different forms without departing from the scope thereof as defined in the appended claims.

What I claim is:—

1. A shearing device of the class described comprising a pair of die holders and a pair of dies each mounted in one of said die holders, each die comprising parts of different contour which are adjustable for providing different shapes, said parts also being reversible to permit the operation of different cutting edges.

2. A shearing device of the class described comprising a die having a plurality of similar reversible die sections each provided with opposite cutting edges of different contour.

3. A shearing die comprising a plurality of sections including two sections of similar contour having opposite cutting edges of different shape, said die sections being arranged for coöperation with each other and being reversible in position.

4. In a device of the class described, a pair of movable members each having a die seat, and a sectional die mounted in each of said seats, each of said dies comprising a plurality of sections including two similar die sections having opposite cutting edges of different contour, whereby said sections may be arranged to conform to objects of different cross-sectional forms.

5. In a device of the class described, a pair of relatively movable die holders each provided with a die seat, and a sectional die mounted upon each of said die seats, the sections of said dies being reversible and adjustable on each die holder and interchangeable between the die holders.

6. In a device of the class described, a pair of movable members each having a die seat, and a sectional die mounted in each of said seats, each of said dies comprising a plurality of sections including two similar die sections having opposite cutting edges of different contour, whereby said sections may be arranged to conform to objects of different cross-sectional forms, the sections of one die being similar to the corresponding sections of the other die.

7. In a device of the class described, a pair of relatively movable die holders, each provided with a recess adapted to form a die seat, said die holders having apertures through the parallel walls of said die seats to receive members of varying shape to be sheared, and sectional dies secured to said die seats around said apertures and adjustable therein for operation upon a plurality of members having different shapes, said sectional dies having parts adapted to conform generally to the contour of the apertures through said die holders.

8. In a device of the class described, a pair of relatively removable die holders, each provided with a die seat and a sectional die mounted upon each of said die seats, said die seats having apertures therethrough around which said die sections are located, said apertures being adapted to receive and operate upon a member of angular cross-section when the latter is located with the principal axis of its cross-section inclined to the vertical and horizontal, the die-sections on the upper and lower sides of the inclined parts of said member having angular projections to enter the angles of said member.

9. In a device of the class described, a pair of die seats having apertures therethrough to receive an I-beam, sectional dies mounted on said die seats around said apertures, said apertures being constructed to receive said I-beam when the latter has the principal axis of its cross-section inclined to the horizontal, the die-sections on the upper and lower sides of the web of said I-beam being provided with parts adapted to enter the angles at the upper and lower edges of said web on the upper and lower sides thereof, respectively.

In testimony whereof, I have subscribed my name.

CHARLES GABRIEL.

Witnesses:
W. B. SIMPSON,
C. M. CHAMBERLIN.